United States Patent Office 3,404,207
Patented Oct. 1, 1968

3,404,207
BIS CARBANILATES
Joseph W. Baker and Kenneth L. Godfrey, Kirkwood, Mo., assignors to Monsanto Company, St. Louis, Mo., a corporation of Delaware
No Drawing. Filed June 8, 1964, Ser. No. 373,551
9 Claims. (Cl. 424—300)

ABSTRACT OF THE DISCLOSURE

This disclosure covers a class of new compounds wherein a pair of carbanilic groups are separated by a glycol bridge which is formed from 2,2'-methylenebis(substituted phenol). These compounds have been found to be useful in the control of certain bacteria and fungi.

---

This invention relates to a novel class of substituted bis carbanilates. More particularly, this invention is concerned with a class of new organic compounds wherein a pair of carbanilic acid groups are separated by a glycol bridge which is formed from 2,2'-methylenebis(substituted phenol). Such materials have been found to possess useful and unexpected biological activity.

The novel compounds of this invention have the formula,

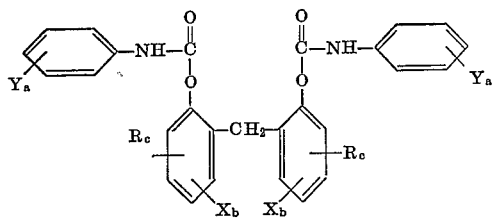

wherein each X and each Y represents a halogen atom selected from the group consisting of chlorine and bromine, each R represents lower alkyl, $a$ is an integer from 0 to 3, $b$ is an integer from 1 to 3, $c$ is an integer from 0 to 1, and the total number of halogen atoms represented by X and Y is at least 4. As employed herein, the term "lower alkyl" connotes those alkyl groups, either straight or branch chain, having up to 4 carbon atoms.

The bis carbanilates of this invention can be prepared by reacting phenyl isocyanate or a halogenated derivative thereof with a 2,2'-methylenebis(substituted phenol). Such a reaction is illustrated by the following equation:

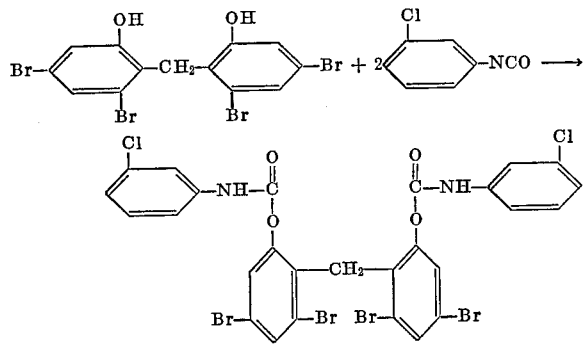

As will be apparent from said equation, it is preferable to employ at least two mols of the isocyanate for each mol of the substituted phenol. However, it should be pointed out that the reaction will proceed where the reactants are present in other than the stoichiometric proportions. For example, a 1:1 molar ratio of the reactants will yield the desired bis carbanilate, although the quantity obtained from such a reaction will be rather small.

In practicing the preparations of this invention, it is often preferred to employ a tertiary amine to catalyze or facilitate the progress of the reaction. Examples of tertiary amines which can be employed are triethylamine, dimethylaniline, pyridine and the like. It is also preferred to carry out the reaction in the presence of an inert organic solvent. Suitable solvents include benzene, toluene, xylene, the chlorinated benzenes, ethyl ether, propyl ether, tetrahydrofuran and the like.

The reaction temperatures employed in the preparation of the compounds of this invention will vary from room temperature to the reflux temperature of the reaction mixture. The specific temperature employed in any given case will be primarily dependent upon the particular reactants used to produce the desired bis carbanilate. It should be noted that, although the presence of both a tertiary amine and an inert inorganic solvent is preferred, neither of these materials is essential to the preparation of the compounds described herein.

The invention will be more fully understood by reference to the following examples, which are set forth herein for the purpose of illustration only and are not to be construed as limiting the scope of this invention in any manner.

EXAMPLE 1

A suitable reaction vessel, equipped with a condenser, a stirrer, a thermometer and an addition funnel, is charged with a solution of 8.5 grams (0.055 mol) of p-chlorophenyl isocyanate in 50 ml. of monochlorobenzene. The solution is stirred and heated to about 50° C. There is then added, dropwise over a period of ½ hour, 2 ml. of triethylamine and 10.2 grams (0.025 mol) of 2,2'-methylenebis(3,4,6-trichlorophenol) in 100 ml. of monochlorobenzene. The resultant mixture is heated to about 100° C. It is then cooled with stirring, and the solvent volume is reduced using a rotary evaporator. Crystallization from toluene yields 8.6 grams of 2,2'-methylenebis(3,4,6-trichlorophenyl) bis(p-chlorocarbanilate) as a white solid, M.P. 160–161° C. Analysis shows 39.3% chlorine as against a calculated value of 39.70% for $C_{27}H_{14}Cl_8N_2O_4$.

EXAMPLE 2

Following the procedures set forth in Example 1, 10.9 grams of m-bromophenyl isocyanate and 8.45 grams of 2,2'-methylenebis(4,6-dichlorophenol) are employed as the reactants. The product obtained is 2,2'-methylenebis(4,6-dichlorophenyl) bis(m-bromocarbanilate).

EXAMPLE 3

Following the procedure set forth in Example 1, 10.3 grams of 3,4-dichlorophenyl isocyanate and 6.7 grams of 2,2'-methylenebis(4-chlorophenol) are employed as the reactants. The product, obtained as a white solid, is 2,2'-methylenebis(4 - chlorophenyl) bis(3,4-dichlorocarbanilate), M.P. 193–195° C.

EXAMPLE 4

Following the procedures set forth in Example 1, 6.5 grams of phenyl isocyanate and 8.5 grams of 2,2'-methylene-bis(3,5-dichlorophenol) are employed as the reactants. The product obtained is 2,2'-methylene-bis(3,5-dichlorophenylcarbanilate).

EXAMPLE 5

Following the procedures set forth in Example 1 (12.2 grams of 3,4,5-trichlorophenyl isocyanate and 6.7 grams of 2,2'-methylenebis(3-chlorophenol) are employed as the reactants. The product obtained is 2,2-methylenebis(3-chlorophenyl) bis(3,4,5-trichlorocarbanilate).

EXAMPLE 6

A reaction vessel, as described in Example 1, is charged with 8.1 grams (0.02 mol) of 2,2′-methylenebis(3,4,6-trichlorophenol) in 100 ml. of dry ether and 2 ml. of triethylamine. There is then added, dropwise over a period of 15 minutes, 3.8 grams (0.02 mol) of 3,4-dichlorophenyl isocyanate in 25 ml. of dry ether. The reactants are stirred at room temperature for about 2 hours, after which they are heated at reflux temperature for about 2¾ hours. The reaction mixture is then filtered, and the solvent volume in the filtrate is reduced using a rotary evaporator. Crystallization from toluene and Skellysolve B (an essentially n-hexane solvent having a boiling range of 60–70° C.), followed by recrystallization from monochlorobenzene, yields 2,2′-methylenebis(3,4,6-tricholophenyl) bis(3,4-dichlorocarbanilate) as a white powder, M.P. 195–198° C. Analysis shows 45.8% chlorine and 3.3% nitrogen as against calculated values of 45.3% and 3.6%, respectively, for $C_{27}H_{12}Cl_{10}N_2O_4$.

EXAMPLE 7

A reaction vessel, as described in Example 1, is charged with 10.3 grams (0.055 mol) of 3,4-dichlorophenyl isocyanate in 50 ml. of monochlorobenzene. The solution is heated to about 50° C., and 7.4 grams (0.025 mol) of 2,2′-methylenebis(4-chloro-o-cresol) in 100 ml. of monochlorobenzene and 2 ml. of triethylamine are added dropwise over a period of ½ hour. An additional 100 ml. of monochlorobenzene is added, and the resultant mixture is heated to about 100° C. It is then cooled, filtered and washed with Skellysolve B. Recrystallization from toluene yields 2.0 grams of 2,2′-methylenebis(4-chloro-o-tolyl) bis(3,4-dichlorocarbanilate) as a white solid, M.P. 245° C. (decomp.).

EXAMPLE 8

Following the procedures set forth in Example 7, 8.5 grams of p-chlorophenyl isocyanate is substituted for the 3,4-dichlorophenyl isocyanate. The product, recrystallized from tetrahydrofuran and obtained as a white solid, is 2,2′-methylene-bis(4-chloro-o-tolyl) bis (p-chlorocarbanilate), M.P. 265° C. (decomp.).

As stated above, the products of the present invention are useful as microbiocides adapted to be employed for the control of bacterial and fungal organisms. In representative tests, 2,2′-methylenebis(3,4,6-trichlorophenyl) bis(3,4-dichlorocarbanilate) is found to be effective against *Staphylococcus aureus* at a dilution in excess of one part per million. Said compound is further found to be effective against both *Aspergillus niger* and *Salmonella typhosa* at a dilution in excess of one part per ten thousand. Similar activity against the first- and third-named organisms is also displayed by 2,2′-methylenebis(4-chloro-o-tolyl) bis(p-chlorocarbanilate). Against the second-named organism, the latter compound is effective at a dilution in excess of one part per one thousand.

While the invention has been described herein with regard to certain specific embodiments, it is not so limited. It is to be understood that variations and modfications thereof may be made by those skilled in the art without departing from the spirit and scope of the invention.

The embodiments of the invention in which an exclusive property or privilege is claimed are defined as follows:

1. A compound of the formula,

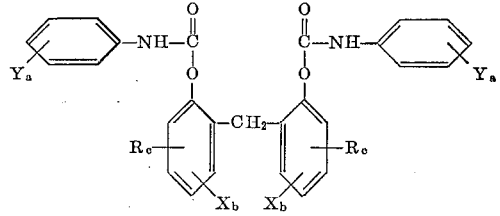

wherein each X and each Y represents a halogen atom selected from the group consisting of chlorine and bromine, each R represents lower alkyl, $a$ is an integer from 0 to 3, $b$ is an integer from 1 to 3, $c$ is an integer from 0 to 1, and the total number of halogen atoms represented by X and Y is at least 4.

2. A compound of the formula,

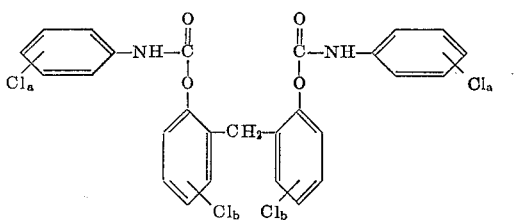

wherein $a$ is an integer from 0 to 3, $b$ is an integer from 1 to 3, and the total number of chlorine atoms is at least 4.

3. 2,2′-methylenebis(3,4,6-trichlorophenyl) bis (p-chlorocarbanilate).

4. 2,2′-methylenebis(4-chlorophenyl) bis(3,4-dichlorocarbanilate).

5. 2,2′-methylenebis(3,4,6-trichlorophenyl) bis(3,4-dichlorocarbanilate).

6. 2,2′-methylenebis(4-chloro-o-tolyl) bis(3,4-dichlorocarbanilate).

7. 2,2′-methylenebis(4-chloro-o-tolyl) bis(p-chlorocarbanilate).

8. A method of controlling the growth of bacterial and fungal organisms which comprises contacting said organisms with a compound as defined in claim 1.

9. A method of controlling the growth of bacterial and fungal organisms which comprises contacting said organisms with a compound as defined in claim 2.

References Cited

UNITED STATES PATENTS 2,777,871  1/1957  Strain _____ 260—479

OTHER REFERENCES

Chemical Abstract: vol. 55, Gump et al., pages 17740G to 17741B relied on.

LORRAINE A. WEINBERGER, *Primary Examiner.*

L. THAXTON, *Assistant Examiner.*